Figure 1:
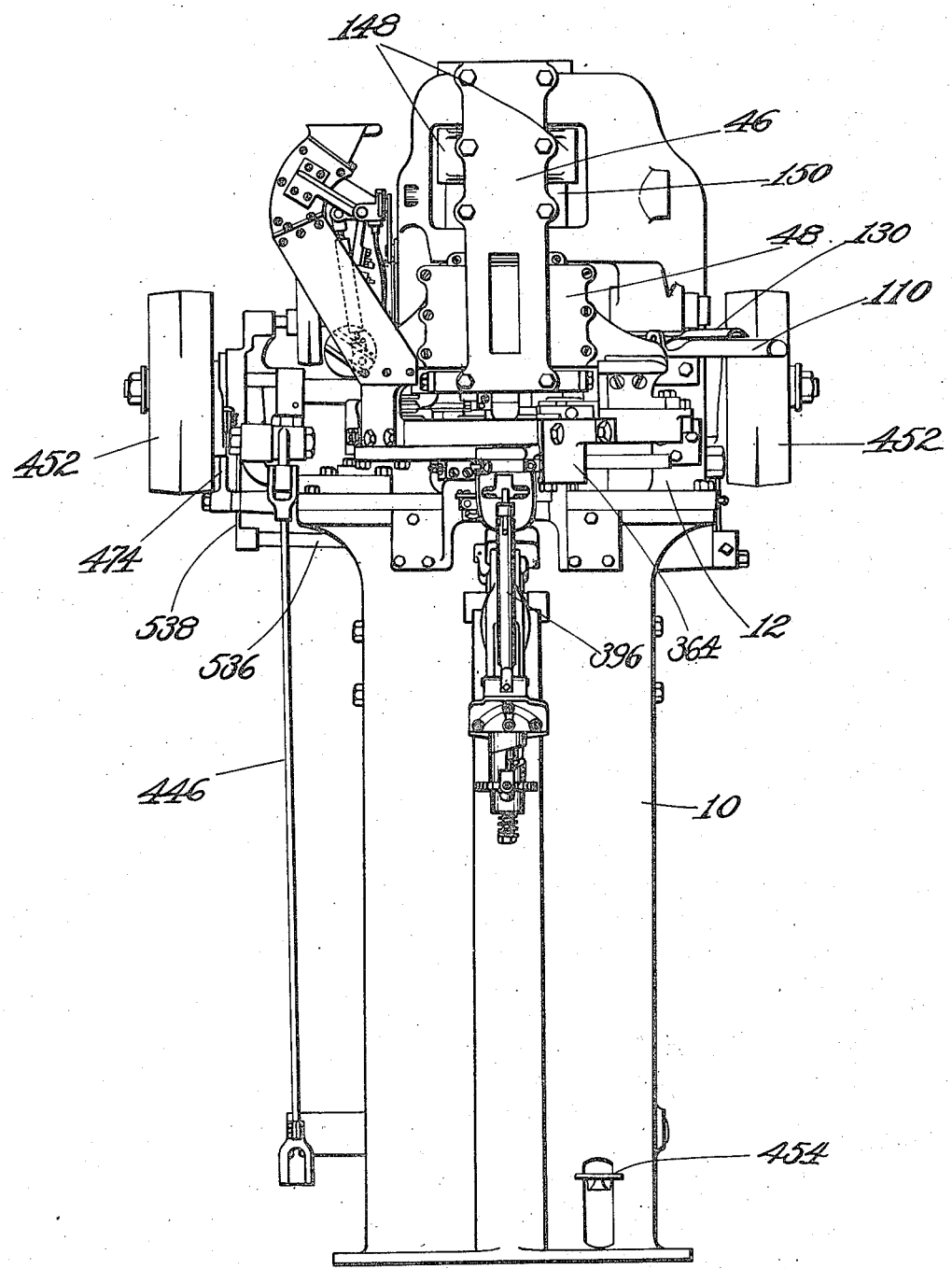

P. R. GLASS.
MACHINE FOR INSERTING FASTENINGS.
APPLICATION FILED MAR. 9, 1910.

1,132,926.

Patented Mar. 23, 1915.
11 SHEETS—SHEET 6.

WITNESSES:
John H. McCrudy
Rose G. Keenan

INVENTOR

P. R. GLASS.
MACHINE FOR INSERTING FASTENINGS.
APPLICATION FILED MAR. 9, 1910.

1,132,926.

Patented Mar. 23, 1915.
11 SHEETS—SHEET 7.

WITNESSES.
John H. McCrady
Rose G. Keenan

INVENTOR.

P. R. GLASS.
MACHINE FOR INSERTING FASTENINGS.
APPLICATION FILED MAR. 9, 1910.

1,132,926.                              Patented Mar. 23, 1915.
                                              11 SHEETS—SHEET 8.

WITNESSES.
John H. McCready
Rose G. Keenan

INVENTOR.
Perley R. Glass

P. R. GLASS.
MACHINE FOR INSERTING FASTENINGS.
APPLICATION FILED MAR. 9, 1910.

1,132,926.

Patented Mar. 23, 1915.
11 SHEETS—SHEET 9.

WITNESSES.
John H. McCready
Rose G. Keenan

INVENTOR.

P. R. GLASS.
MACHINE FOR INSERTING FASTENINGS.
APPLICATION FILED MAR. 9, 1910.

1,132,926. Patented Mar. 23, 1915.
11 SHEETS—SHEET 11.

WITNESSES
John H. McCredy
Rose G. Keenan

INVENTOR.
Perley R. Glass

UNITED STATES PATENT OFFICE.

PERLEY R. GLASS, OF BROOKLINE, MASSACHUSETTS, ASSIGNOR TO UNITED SHOE MACHINERY COMPANY, OF PATERSON, NEW JERSEY, A CORPORATION OF NEW JERSEY.

MACHINE FOR INSERTING FASTENINGS.

1,132,926.

Specification of Letters Patent. Patented Mar. 23, 1915.

Application filed March 9, 1910. Serial No. 548,139.

*To all whom it may concern:*

Be it known that I, PERLEY R. GLASS, a citizen of the United States, residing at Brookline, in the county of Norfolk and State of Massachusetts, have invented certain Improvements in Machines for Inserting Fastenings, of which the following description, in connection with the accompanying drawings, is a specification, like reference characters on the drawings indicating like parts in the several figures.

This invention relates to machines for inserting fastenings and is herein shown as embodied in a fastening inserting machine which inserts at a single operation all of the fastenings to be inserted in a single piece of work.

In the manufacture of boots and shoes, in which art the invention is especially useful, machines of the general type above referred to have been employed for the most part for attaching heels, such work presenting comparatively uniform conditions and being of such a nature that it could scarcely be performed satisfactorily by a machine which operated to insert the fastenings successively. The other fastening inserting operations upon boots and shoes have been performed almost exclusively, up to the present time, by machines which insert the fastenings successively, such machines being adapted to meet better the varying conditions of the work and to operate upon a greater number of shoes in a given time than the multiple fastening inserting machines or gang nailers hitherto known. Besides the heel attaching operation, however, there is performed in the manufacture of the ordinary types of boots and shoes another fastening inserting operation which presents substantially the same conditions so far as uniformity of numbers and locations of the nails is concerned as the heel attaching operation. This operation is the attachment of the heel-seat. For this operation there would be many advantages in employing a machine which would insert at one time all of the fastenings required, provided the machine could perform as much work as machines for successively inserting fastenings for this purpose.

An object of the present invention, therefore, is to provide an improved machine of the type above referred to which shall have especial utility for attaching the heel-seat ends of outsoles to the insoles and uppers, which shall have capacity for a quantity of work that will greatly exceed that performed by machines of other types, and which shall produce work of a quality superior to that produced by machines of other types.

Other objects of the invention are to provide a machine of this type which will operate upon a wide range of sizes of boots or shoes, and which will preferably not only attach the heel-seat but also perform other operations thereon, to provide convenient and easily operated means for adjusting the machine to cause it to operate upon different ranges of sizes, by which a quick adjustment from one size range to another may be effected, and to provide a machine of this type in which the proper sequence of operations is positively insured, whereby danger of breakage of the machine and damage to the work is avoided.

Still other objects and features of the invention will be apparent from a consideration of the following description and claims in connection with the accompanying drawings, in which,—

Figure 2:
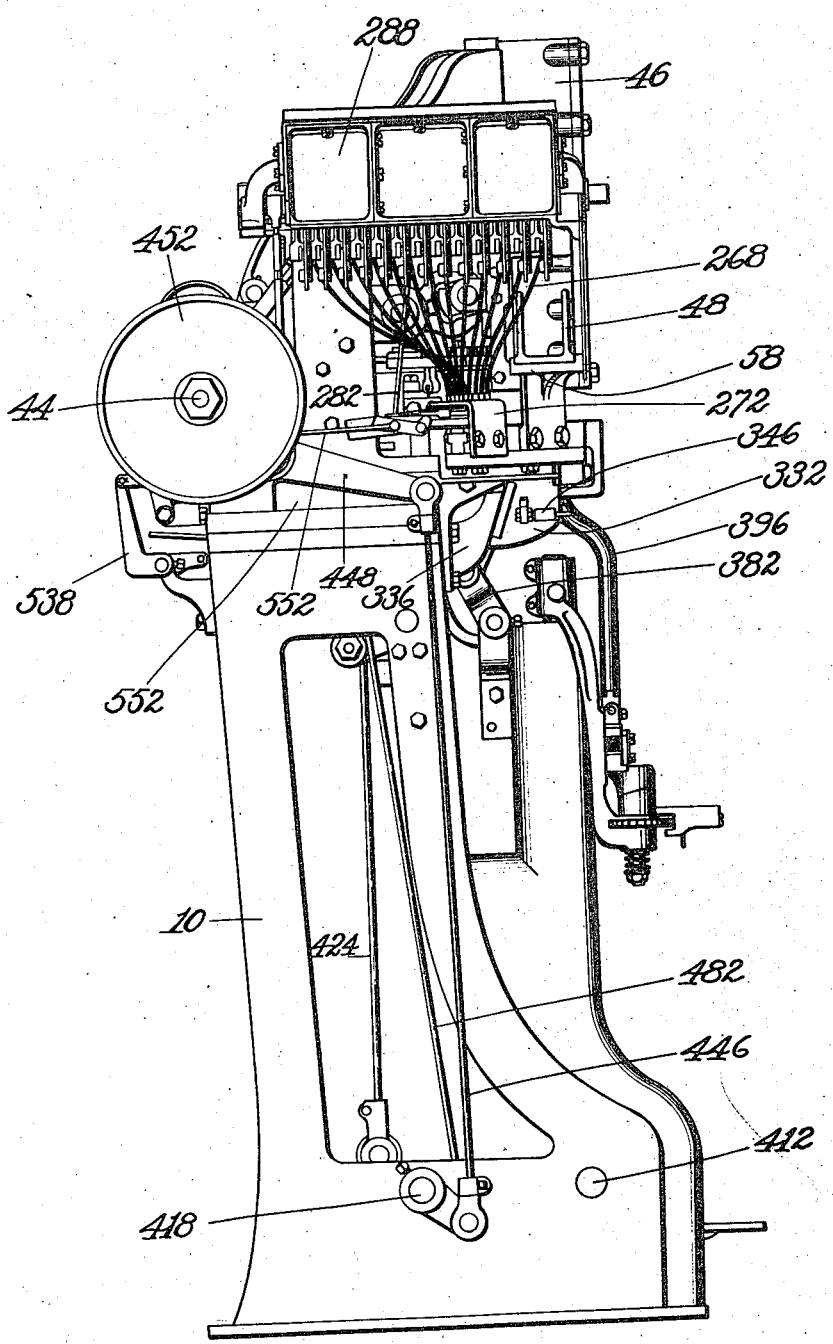
Figure 3:
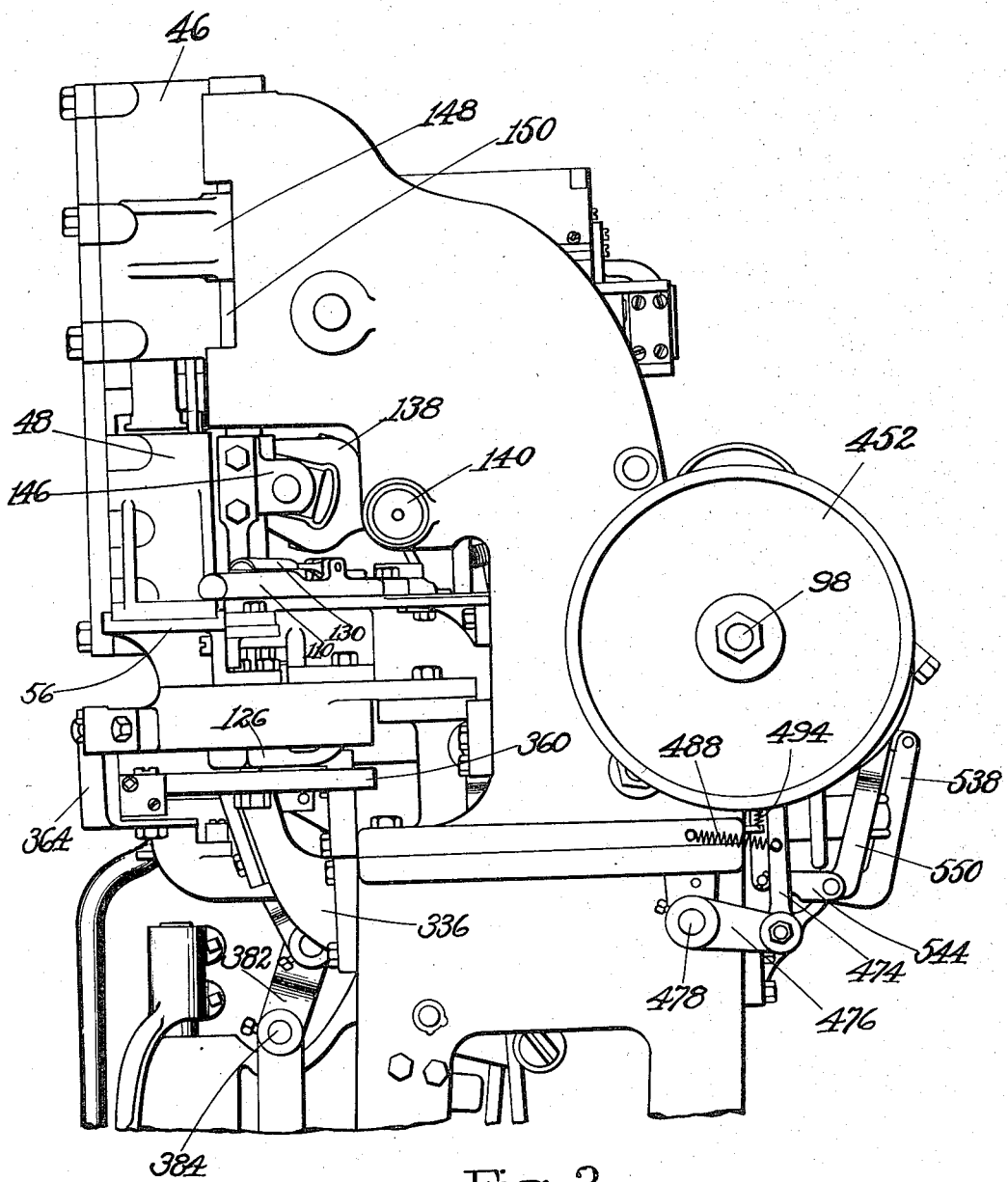
Figure 4:
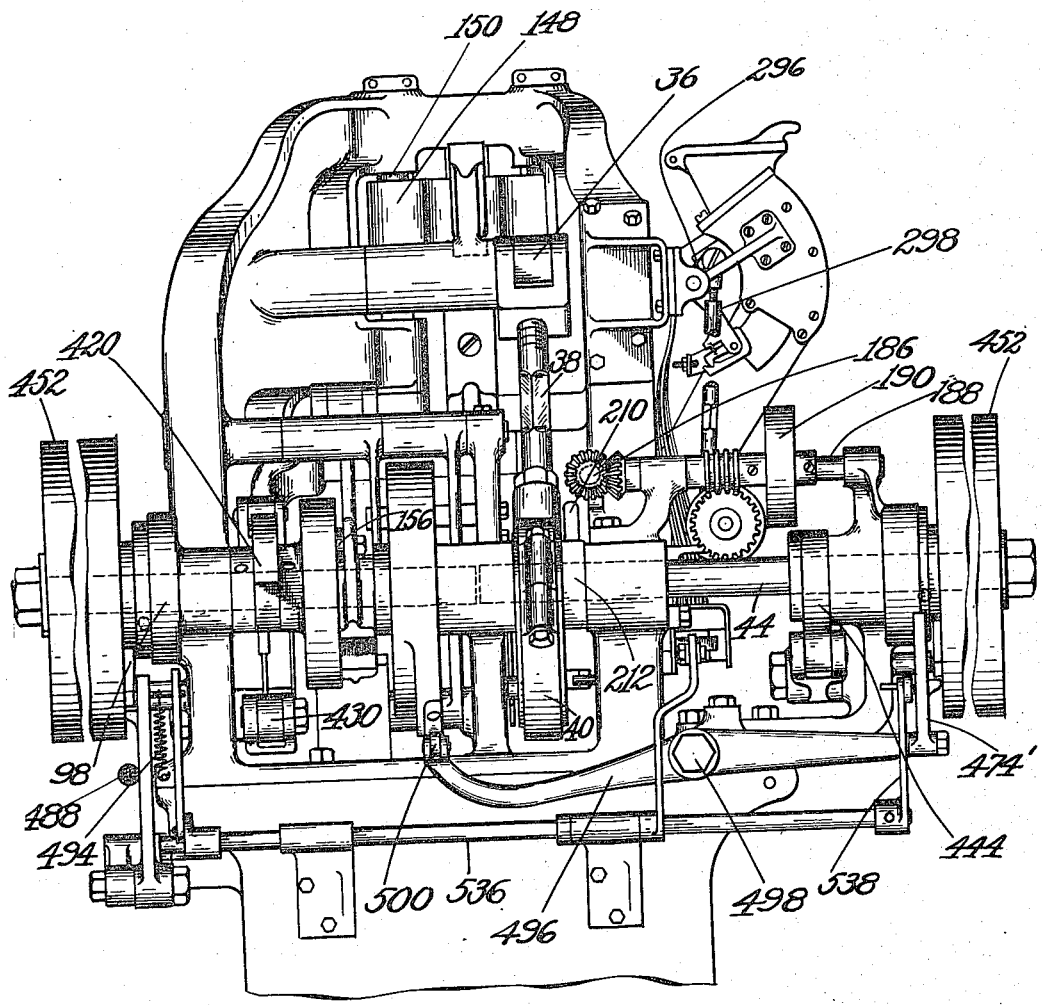
Figure 5:
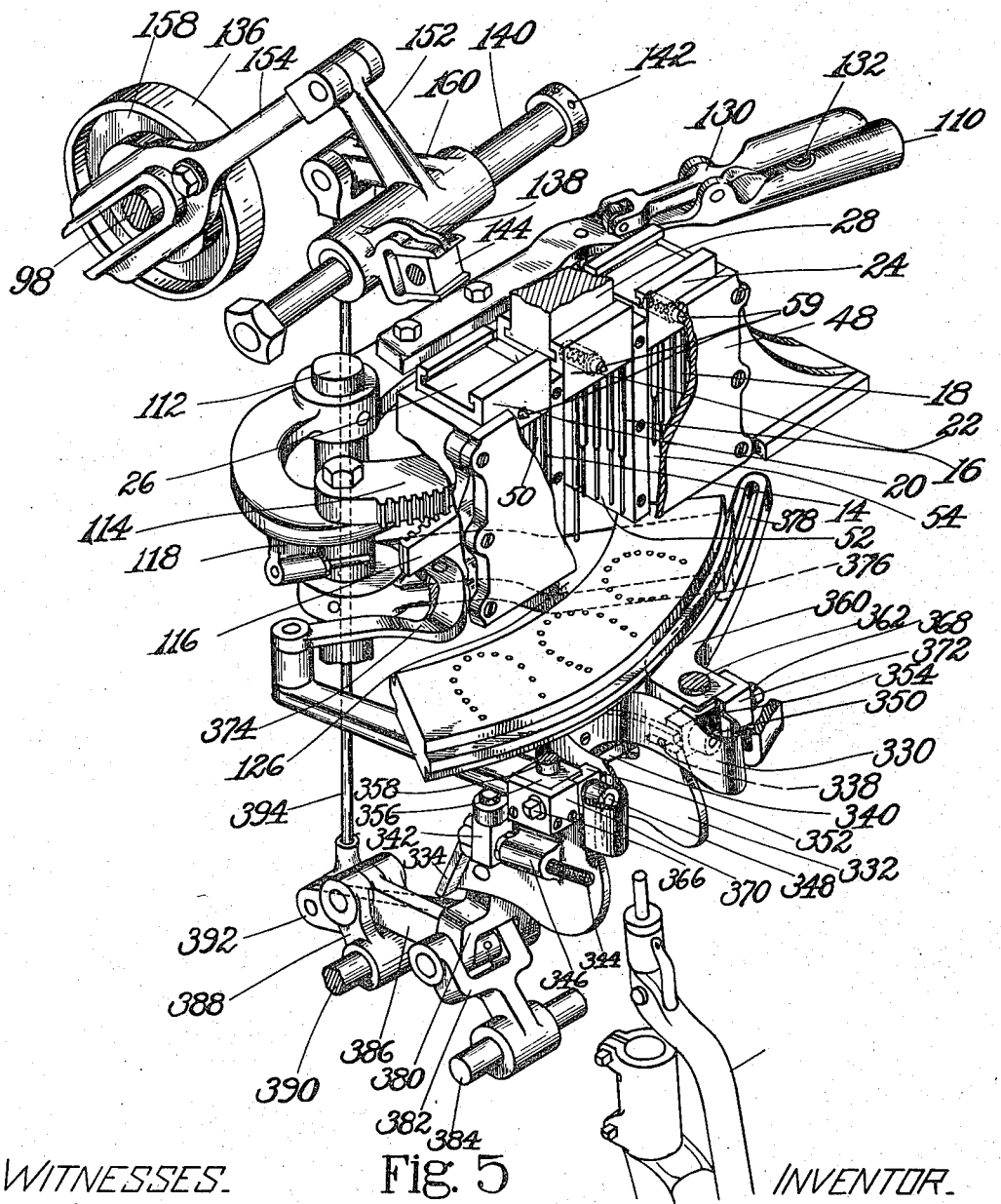
Figure 6:
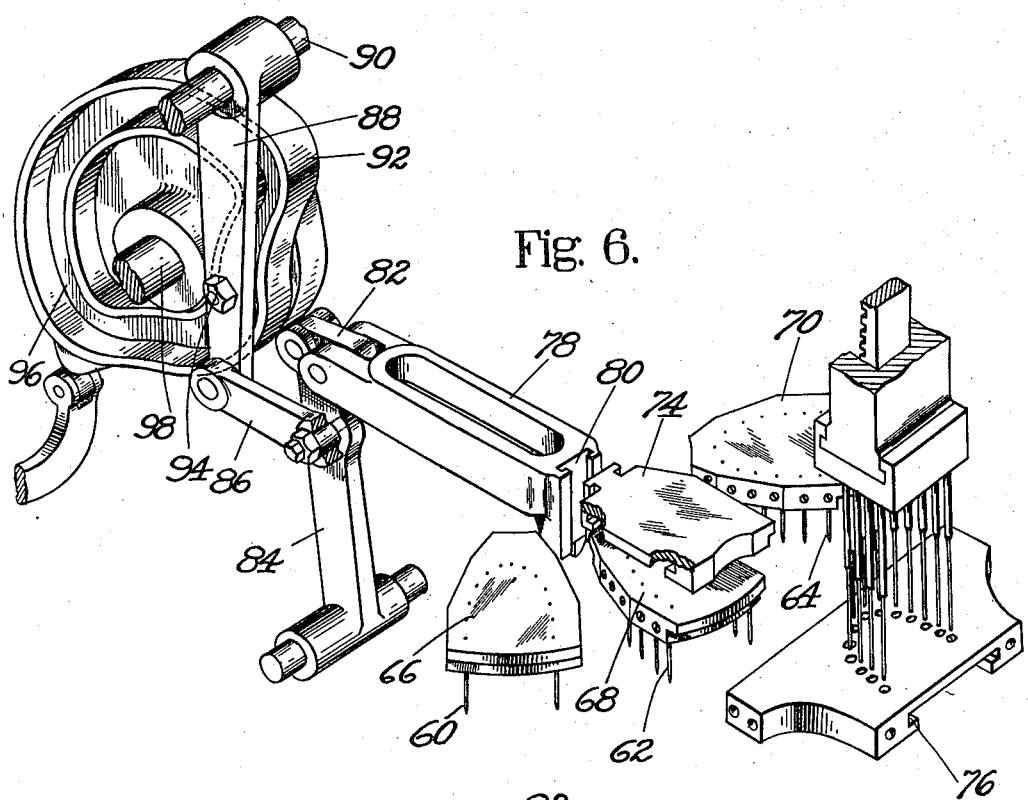
Figure 7:
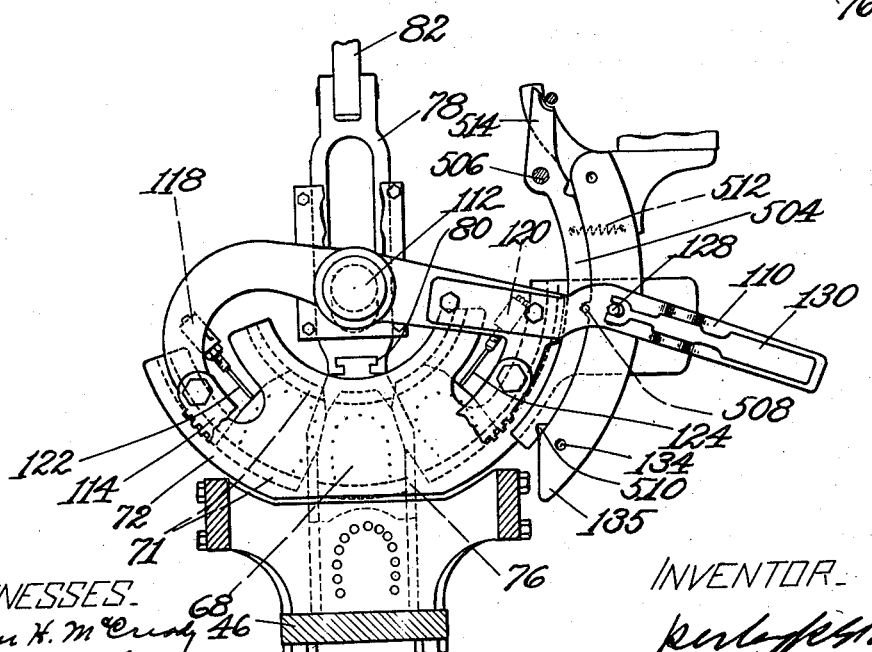
Figure 8:
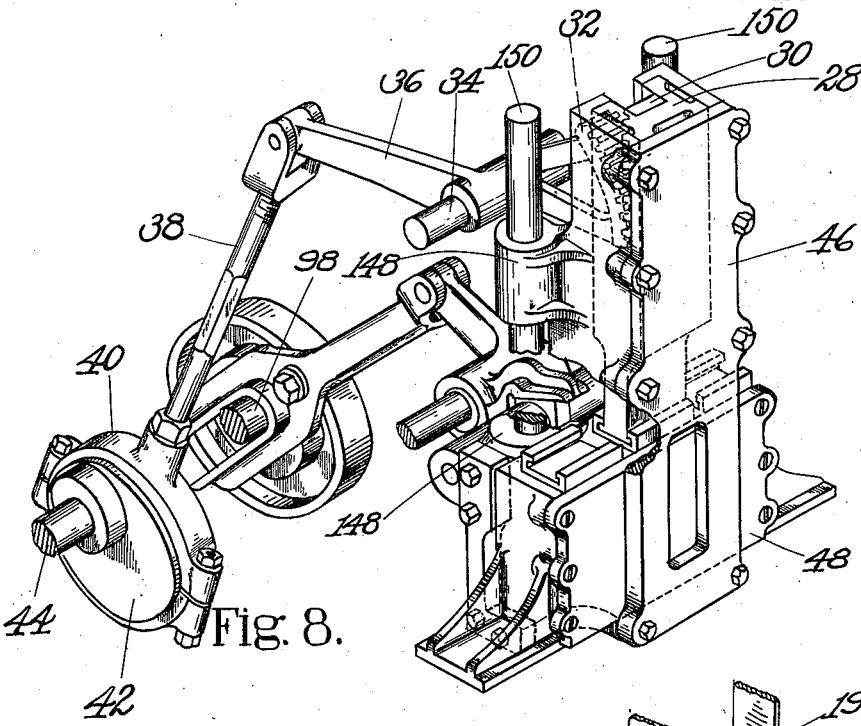
Figure 9:
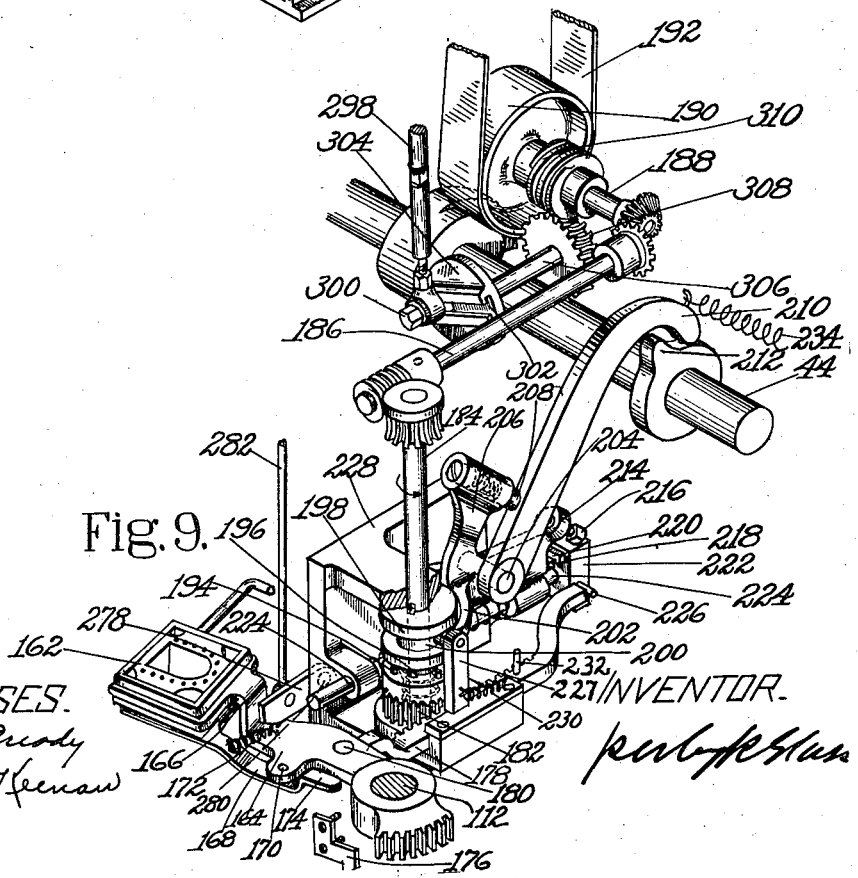
Figure 10:
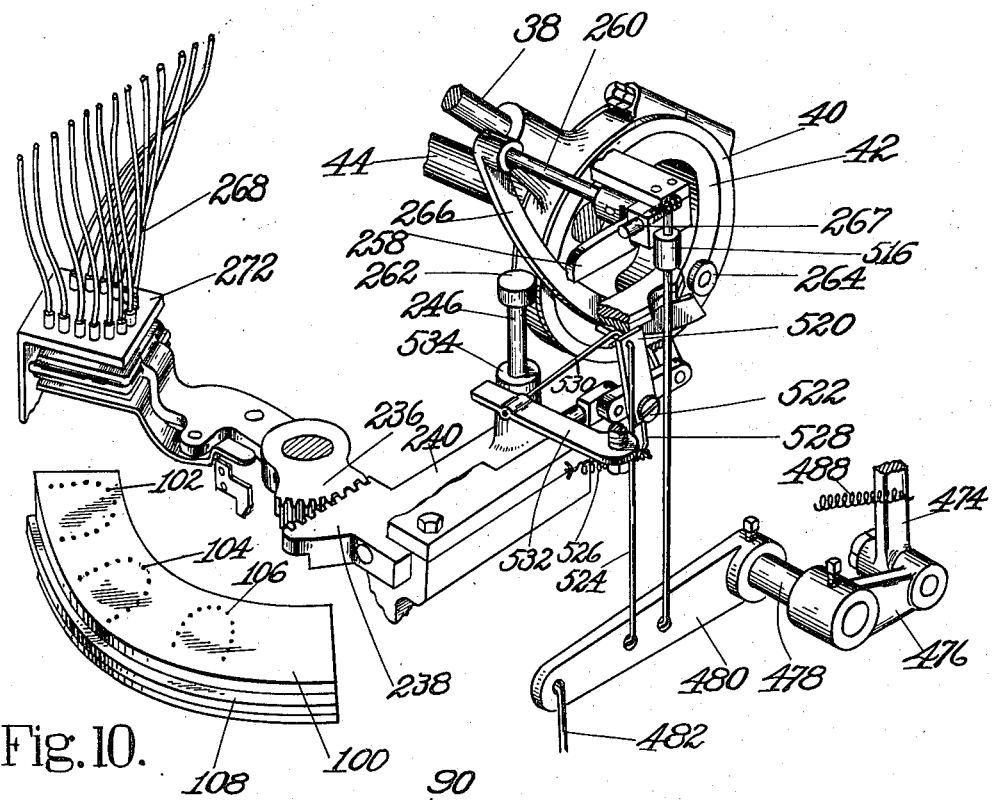
Figure 11:
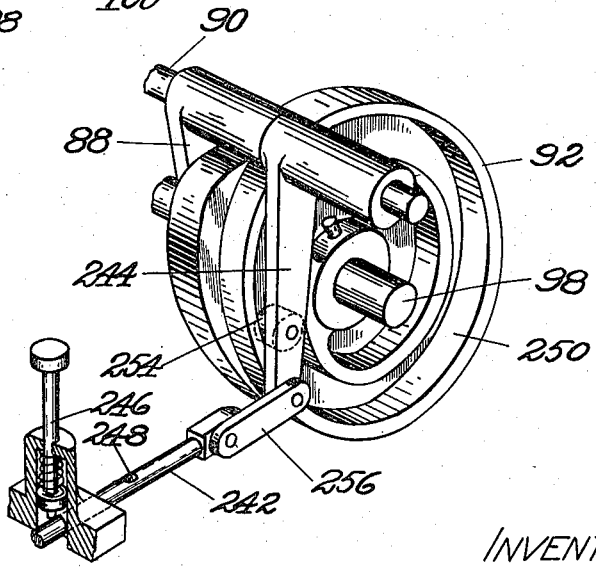
Figure 12:
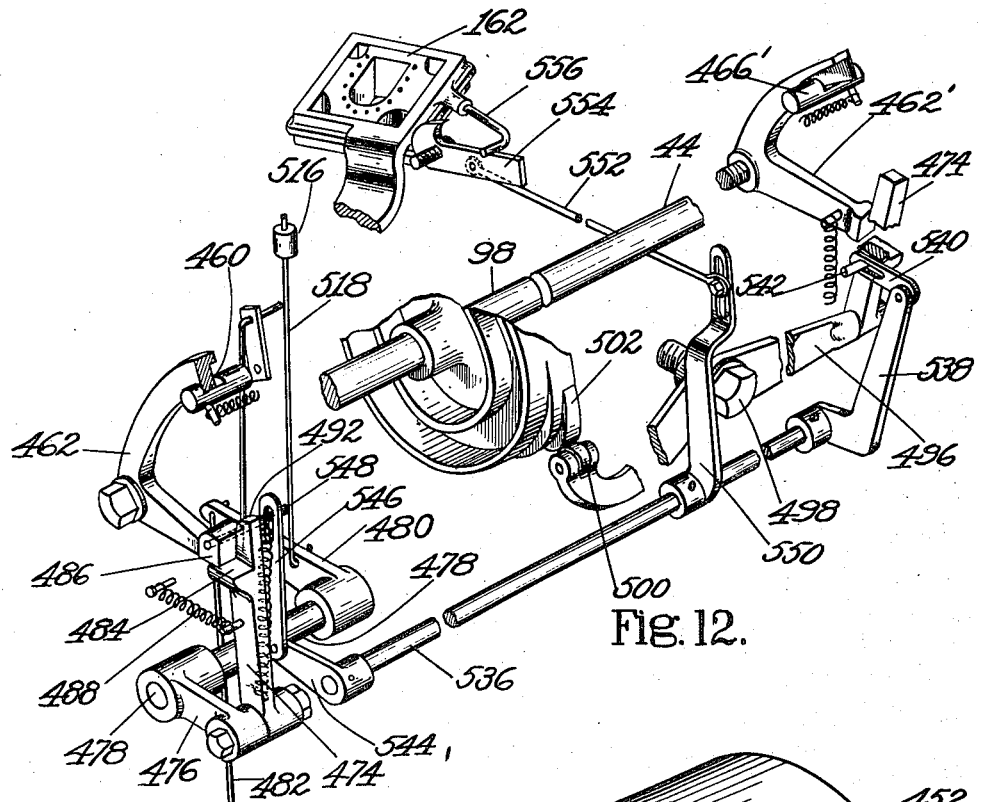
Figures 13, 14:
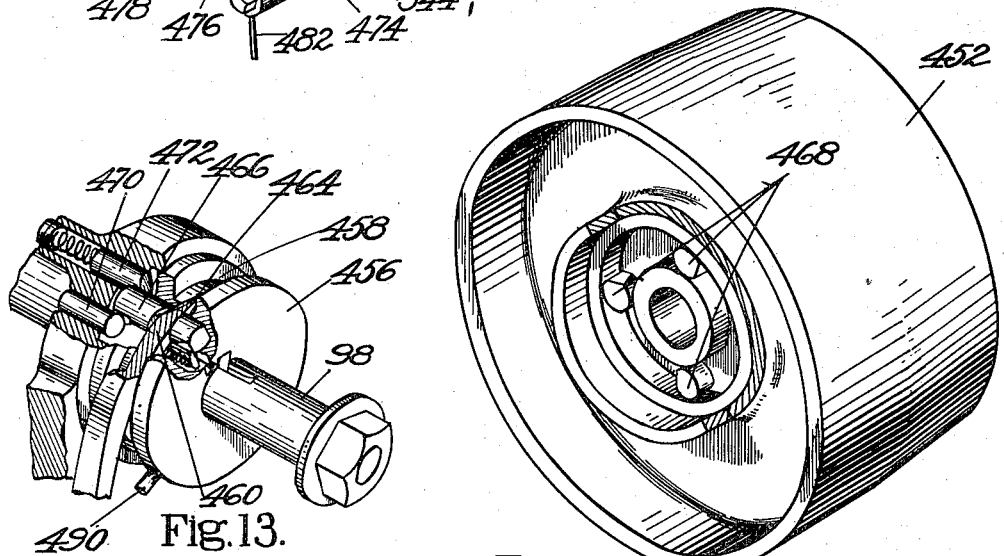
Figure 15:
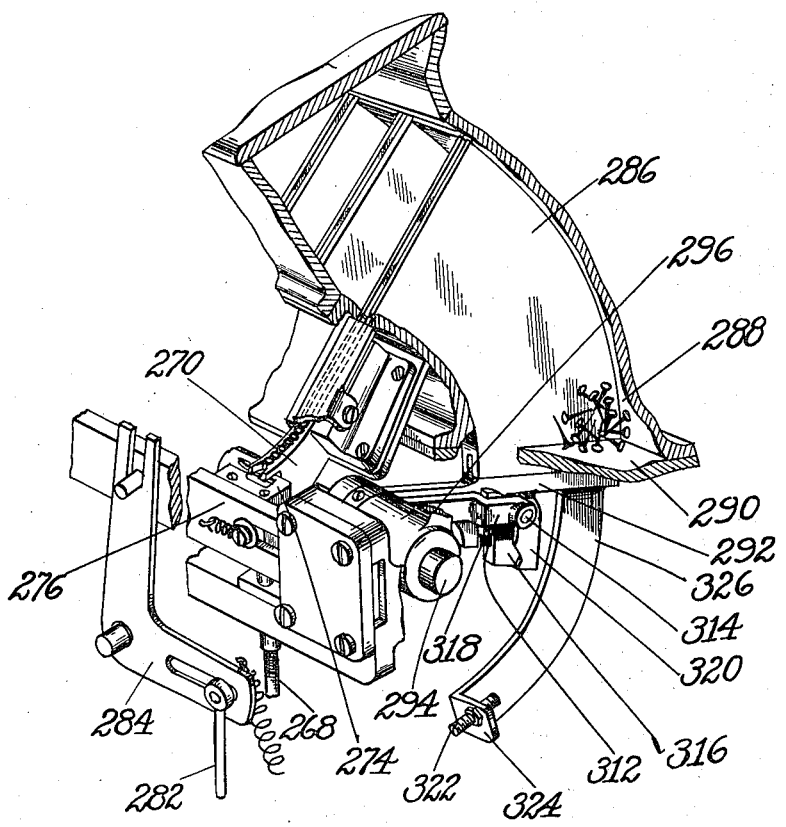
Figure 16:
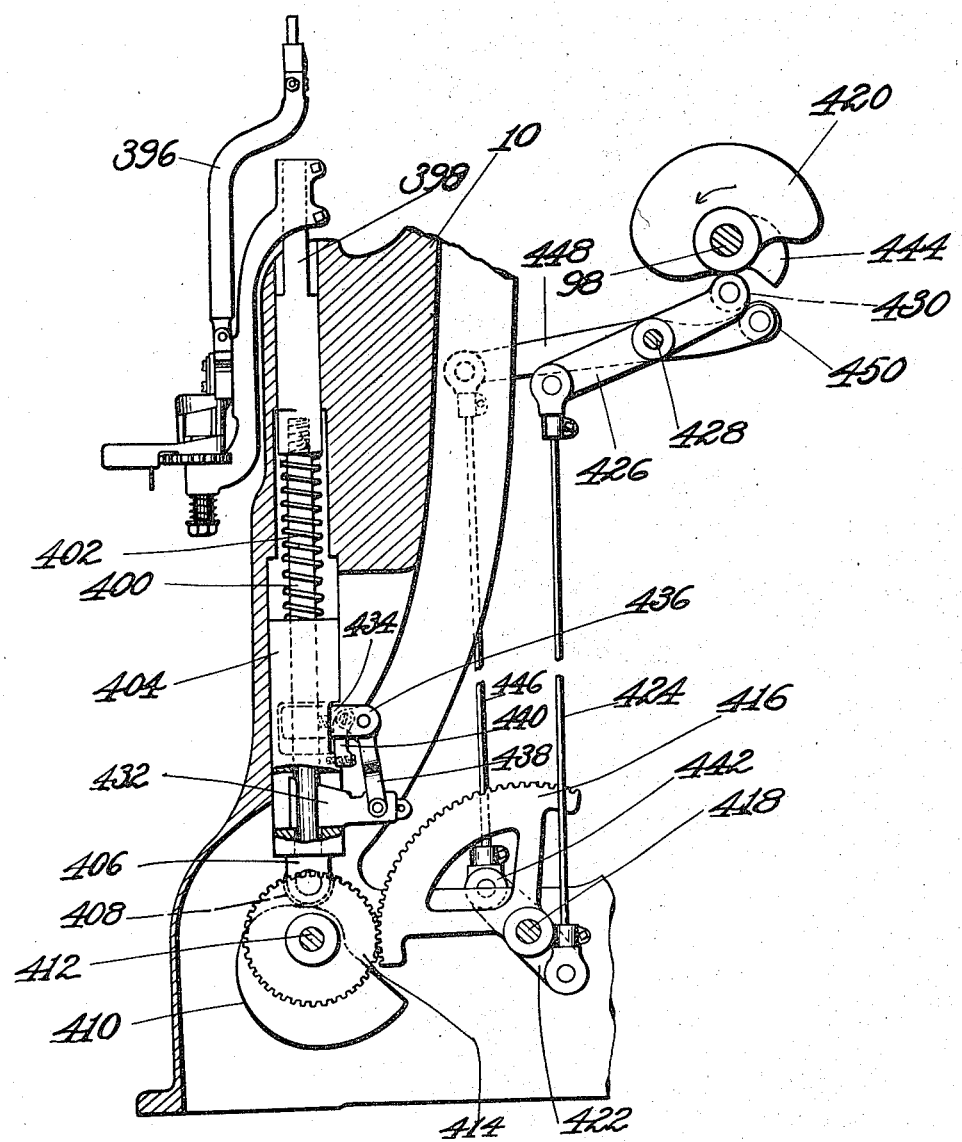

Figure 1 is a front elevation of a preferred embodiment of the invention; Fig. 2 is an elevation of that side of the machine which is to the left of an operator standing in front of the machine; Fig. 3 is a side elevation of the upper part of the machine viewed from the side opposite to that shown in Fig. 2; Fig. 4 is a rear elevation of the upper part of the machine; Fig. 5 is a detail perspective with parts in section, and parts broken away, showing the nail driving mechanism and the heel-seat trimming mechanism; Fig. 6 is an exploded perspective showing the awls and their operating mechanism; Fig. 7 is a plan view of the size changing mechanism by which the different sets of awls are brought successively into operative position, this view showing also one of the treadle locks for preventing actuation of the machine until the parts are in their proper operative relations; Fig. 8 is a perspective view of the awl driving head or casing and the driver guide slide with associated parts; Fig. 9 is a perspective view of the nail loader and the mechanism for returning it to nail receiving position; Fig. 10 is a perspective detail of the nail loader and the mechanism for moving it into nail delivering position; Fig. 11 is a perspective detail of a part of the mechanism for moving the nail loader into delivering position, showing especially the cam through which the rack slide is operated and the locking means in the operative connections between the cam and said slide; Fig. 12 is a perspective detail of the means for controlling the order of operation of the two sides of the machine; Fig. 13 is a perspective detail of a starting clutch; Fig. 14 is a perspective view of one of the loose driving pulleys; Fig. 15 is a perspective detail, partly in section, of the means for supplying nails to the nail loader; Fig. 16 is a view of the work support operating mechanism.

The frame of the machine comprises a standard 10 and a head 12, the principal operative parts of the machine being mounted in the head.

The machine is intended especially for nailing heel-seats, that is, for attaching the heel-seat end of the outsole to the insole and upper, and in order that the machine may operate effectively upon shoes of a wide range of sizes provision is made for quick and easy adjustment of various parts whereby the machine may be adapted for handling different successive ranges of sizes, the illustrated machine having capacity for dealing with sizes from 5 to 12 in three successive ranges of five sizes each.

The nails which attach the heel-seat are preferably driven simultaneously and there are therefore provided in the illustrated machine three gangs of nail drivers, each gang being intended for use with five different sizes of shoes. These gangs of drivers 14, 16 and 18 comprise, as here shown, 13 drivers each, and are carried respectively by three driver plates or blocks 20, 22 and 24 which have formed in their upper faces alined dove-tailed grooves 26 arranged to receive in succession the dove-tailed lower end of the driver operating plunger 28. The plunger 28 is provided with a rack 30, preferably formed as a separate piece inserted in a deep groove in the plunger 28 in order that it may come as near as possible into a line with the center of the gang of drivers.

The rack 30 meshes with a segment gear 32 loose upon a shaft 34 fixed in the machine frame. Extending rearwardly from the hub of the gear 32 is an arm 36 pivotally connected at its rear end to a link 38, having an eccentric collar 40 surrounding an eccentric 42 upon the driving shaft 44. The driver operating plunger 28 reciprocates in a vertically movable awl operating head or casing 46, the upper part of the plunger being shaped to fit the interior of the casing 46 and the lower end being somewhat smaller in one of its transverse dimensions, so that it may enter one of the guides in a driver guide slide 48 arranged to slide through the casing 46 to bring its guides 50, 52 and 54 and driver blocks 20, 22 and 24 successively into operative relation to the plunger 28. The slide 48 moves in stationary ways formed in brackets 56 and 58 upon opposite sides of the casing 46. Spring-pressed plungers 59 carried by the driver blocks enter sockets in the guides and hold the blocks yieldingly in their elevated positions with the grooves 26 in alinement.

The awls, of which there are three gangs, 60, 62 and 64, corresponding in sizes to the three gangs of drivers are carried in dove-tailed plates 66, 68 and 70 respectively, which slide in arc-shaped ways 71 formed in a casing 72 carried by the machine frame. The ways in the casing 72 are interrupted substantially intermediate their length to receive an awl-carrying slide 74 which travels in transverse guideways 76 arranged above the arc-shaped ways 71, the slide 74 having formed in that portion which extends into the path of travel of the plates 66, 68, 70 a continuation of the ways 71 and being so dimensioned that it can sustain an awl-carrying plate and transfer the plate from its position in the ways 71 into position beneath the awl operating head or casing 46.

Automatic means is provided for moving the slide 74 to cause it to bring the selected awl carrying plate with its awls into operative position beneath the head 46. The illustrated means comprises a pusher bar 78 having formed in its front end a vertically extended dove-tailed guideway 80 which receives a dove-tail upon the rear end of the slide 74 to provide for vertical movement of the slide 74 and the awls with respect to the pusher bar 78 during the awl-driving movement of the head 46. At its rear end the pusher bar 78 is connected by a link 82 to the upper end of the lever 84 fulcrumed in the machine frame, said lever 84 being connected by a link 86 to a second lever 88 loose upon a stationary shaft 90, the lever 88 being oscillated, and through its connections with the lever 84 imparting reciprocating movement to the pusher bar 78, by connections with a cam disk 92 comprising a cam roll attached to the lever at 94 and entering a cam groove 96 in the cam disk. The cam disk 92 is carried on the driving shaft 98 which is alined with, but separate from, the driving shaft 44 hereinabove referred to.

The nails to be driven are delivered to suitable openings in a nail block 100 through which they pass into contact with the surface of the work and into which the drivers enter to drive them into the work. The nail block 100 is provided with three sets of nail receiving openings, 102, 104, 106, corresponding in arrangement with the arrangement of the respective drivers and awls which are to enter the said openings. In order that the openings suited to the particular gang of drivers or awls which is to operate may be brought into position beneath the plunger 28, the nail block 100 is constructed and arranged to slide in ways in the machine frame to bring the different sets of openings successively into position beneath the said plunger. To this end the block 100 is provided with lateral ribs 108 which enter grooves formed in the machine frame, said block being curved along its greatest dimension so that it may slide in arc-shaped ways. The shoe to be operated upon will be pressed up against the under side of the block 100 and on its under side beneath each set of nail receiving openings the block will be preferably shaped so that it will conform approximately to the shape of the heel-seat end of the shoe pressed against it.

Preferably a single means will be provided for moving the nail block, the awls and the drivers into their proper operative relations to each other. The illustrated means comprises a lever 110 attached to a vertical rock-shaft 112. The lever 110 carries a segment rack 114 which meshes with a straight rack 116 upon the back side of the driver guide slide 48. Turning of the lever with the rock-shaft 112 will therefore cause the slide 48 to move across the front of the machine and to bring the driver blocks 20, 22 and 24 successively into operative relation to the plunger 28.

Carried in downwardly projecting lugs 118, 120 upon the lever 110 are pushers 122 and 124 for the awl carrying plates, the pusher 122 engaging the awl plate 66 and the pusher 124 engaging the awl plate 70. The middle plate 68 is moved by engagement with one or the other of the plates 66 and 70. Rigidly attached to the rock-shaft 112 below the lever 110 and extending beneath the casing 72 in which the ways 71 for the awl plates are formed is an arm 126 which is connected to the nail block 100. The ways in which the nail block 100 travels and the ways 71 in which the awl plates travel are both concentric with the rock-shaft 112. It will therefore be seen that turning of the rock-shaft 112 as the lever 110 is moved to effect the movement of the slide 48 causes the simultaneous movement of the awl plates 66, 68 and 70 and the nail block 100 and therefore brings the proper set of openings in the nail block into position beneath the gang of drivers intended to enter those openings, and brings that one of the plates 66, 68 and 70 which carries the appropriate set of awls into such position in the slide 74 that on the next forward movement of the pusher bar 78 the awls will be brought into operative position beneath the head or casing 46.

The lever 110 is locked at its different positions of adjustment by means of a plunger 128 upon one end of a latch member 130 pivoted upon the handle of the said lever, the plunger being maintained yieldingly in its lowermost position by a spring 132 between the handle part of the latch member and the handle part of the lever. The plunger 128 is arranged to enter openings 134 in an arc-shaped plate 135 extending along the path of movement of the lever 110, there being one opening for each of the gangs of awls and drivers so located that the lever 110 will be locked when the awls, drivers and nail block are in their proper positions of adjustment.

The movement of the head or casing 46 to force the awls into the work is effected by operative connections with a cam disk 136 upon the driving shaft 98 comprising a forked arm 138 of a lever fulcrumed upon a shaft 140 mounted eccentrically in the machine frame whereby it may be turned by pins entering openings 142 in one end of the shaft to adjust the fulcrum about which the lever turns and thereby vary the limits of movement of the head 46. The forked arm 138 receives between its members a block 144 pivoted between ears 146 extending rearwardly from the casing or head 46, these ears being formed upon the lower pair of guiding extensions 148 of the casing 46 which slide over vertical guide rods 150. The lever arm 138 forms one arm of a three-armed lever, another arm of which 152 is pivotally connected to a roll-carrying link 154 forked at its rear end to embrace the shaft 98 and carrying between its ends at 156 a cam roll entering a cam groove 158 in the cam disk 136. The third arm 160 of the three-armed lever serves to actuate mechanism hereinafter to be described for trimming the heel-seat.

The nails are delivered to the openings in the nail block by a loader 162 carried in a squared opening in the outer end of the arm 164 of a lever fulcrumed upon the rock-shaft 112, through which lever the nail loader is moved between nail receiving and nail delivering positions. The nails are retained in the loader 162 until the loader comes into delivering position by a retaining plate 166 having a rearwardly extending arm 168 pivoted at 170 upon the lever arm 164, the retaining plate 166 being kept normally in its retaining position by a spring 172 connected at one end to the arm 168 and at its other end to the lever arm 164.

Beyond the pivot 170 the arm 168 is shaped to form a tripping member 174 arranged to engage a stop 176 upon the machine frame and move the retaining plate 166 so that openings in said plate are brought beneath the corresponding openings in the nail loader 162, thereby permitting the nails carried by the nail loader to drop through into the nail receiving openings in the nail block 100. It will be understood from the foregoing description that the stop 176 is so located that the tripping member 174 engages it just as the nail loader 162 is coming into nail delivering position over the nail block 100.

In Fig. 9 is shown the mechanism for moving the nail loader 162 from nail delivering position into nail receiving position. This mechanism comprises a rack slide 178 pivotally connected at 180 to the arm 164 of the nail loader lever, said rack engaging a pinion 182 loosely mounted upon the vertical shaft 184 to which it is arranged to be clutched by mechanism hereinafter to be described.

The shaft 184 is driven by a worm and gear connection with a horizontal shaft 186 itself driven by a bevel gear connection with a second horizontal shaft 188 upon which is mounted a driving pulley 190 connected by a belt 192 with a suitable source of power. Upon its upper end the pinion 182 is provided with a series of pins 194 with any one of which a pin 196 carried upon a clutch sleeve 198 is adapted to be moved into engagement. The clutch sleeve 198 is keyed to the shaft 184 to cause it to turn therewith and is normally kept in its uppermost position on the shaft by a spring socketed in the pinion 182 and bearing against the under side of the sleeve 198. It will be understood that the sleeve 198 may be moved longitudinally of the shaft 184. The sleeve 198 is provided with a peripheral groove 200 in which travel rollers upon the fork members of a forked arm 202 of a three-armed lever the fulcrum of which is constituted by a shaft 204.

The arm 202 is extended upon the other side of the shaft 204 and in this extension or second arm 206 is carried a spring-pressed plunger 208 which bears against the upper side of a second lever 210 also fulcrumed upon the shaft 204 and having a curved upper end arranged to be engaged by a tappet cam 212 upon the driving shaft 44. The third arm 214 of the three-armed lever carries a set screw 216 arranged to bear upon the under side of the arm 210. In this third arm also is carried a catch 218 arranged to engage the upper side of a catch member 220 upon a block 222 carried upon the rear end of a spring-actuated plunger 224 arranged to slide in bearings in the machine frame and lock the clutch sleeve 198 in operative position. A pin 226 upon the block 222 lies in the path of the rear end of the rack slide 178 in such position that it will be engaged by the slide as the nail loader 162 comes into its nail receiving position and thus leave the lever through which the clutch sleeve 198 is moved into clutching relation to the pinion 182 free to return the clutch sleeve to its inoperative position.

To prevent the movement of the clutch sleeve 198 into operative position while the nail loader 162 is in nail receiving position, a stop 227 is pivoted upon the forked arm 202 and is yieldingly held in engagement with a portion of the bracket 228 and in vertical alinement with its pivot by a spring 230. When the nail loader 162 is moved from nail receiving into nail delivering position a pin 232 upon the rack slide 178 engages the stop 227 and turns it about its pivot out of locking relation to the bracket 228 and thus permits the forked arm 202 to move the clutch sleeve 198 into operative position when the tappet cam 212 engages the upper end of the lever 210. If the tappet cam 212 engages the upper end of the lever 210 while the stop 227 is in locking position the spring-pressed plunger 208 will yield into its socket in the lever arm 206 and the movement of the lever 210 will have no effect upon the clutch sleeve 198. The spring 234 serves to hold the upper end of the lever 210 in operative relation to the tappet cam 212.

The nail loader 162 is moved from nail receiving into nail delivering position by mechanism now to be described which is inoperative when the mechanism hereinabove described for moving the loader from nail delivering to nail receiving position is operative. Preferably formed integral with the lever arm 164 is a segment rack 236 which engages a straight rack 238 upon a rack slide 240 guided in the machine frame. Sliding within a longitudinal bore in the rack slide 240 is a rod 242 arranged to be locked to the slide 240 to transmit thereto the motion of a cam operated lever 244 upon the stationary shaft 90.

The means for locking the slide 240 and the rod 242 together comprises a spring-pressed plunger 246 shaped at its lower end to enter a socket 248 in the rod 242 when the socket comes into operative position beneath the plunger. The lever arm 244 receives its motion from a cam groove 250 in the cam disk 92 upon the shaft 98, a cam roll 254 upon the arm 244 traveling in said groove. At its lower end the arm 244 is connected by a link 256 with the rear end of the rod 242.

When the nail loader 162 has been moved into fastening delivering position by the mechanism just described, this mechanism is rendered inoperative to prevent its interference with the operation of the mechanism for moving the loader from fastening delivering to fastening receiving position. The means for rendering the said mechanism inoperative comprises a lifting arm 258 carried by a short rock-shaft 260 having bearings in the machine frame, said arm being arranged to engage under the head 262 of the spring-pressed plunger 246 as the slide 240 comes into its rearmost position. The lifting arm is operated to lift the plunger out of the socket 248 in the rod 242 through the operation of a roll 264, carried by the eccentric 42, upon a cam arm 266 upon the end of the rock-shaft 260 remote from the arm 258.

A spring-pressed plunger arranged in a socket in the machine frame adjacent to the lifting arm 258 is engaged by the head 262 of the plunger 246 as the slide 240 comes into its rearmost position, and as the plunger 246 is lifted by the lifting arm 258 the small plunger 267 springs out beneath the head 262 and holds the plunger 246 out of the socket 248 until the slide 240 is moved to carry the plunger 246 out of alinement with said socket.

The means for supplying nails to the nail loader when it is in fastening receiving position comprises a plurality of flexible nail tubes 268, one for each nail opening in the nail loader, these tubes guiding the nails from a corresponding plurality of raceways 270 into openings in a plate 272 arranged above the corresponding openings in the nail loader when in nail receiving position. Coöperating with each of the raceways is a separator 274 yieldingly connected to a common separator bar 276 through which all of the separators are operated simultaneously to deliver nails to the tubes 268. Means is provided through which the bar 276 is operated as the nail loader comes into nail receiving position beneath the plate 272. This means comprises a lever 278 pivoted at 280 upon the machine frame and having an end arranged to be engaged and lifted by the lever arm 164 as the nail loader comes into nail receiving position. Pivotally connected to the lever 278 intermediate its ends is a rod 282 adjustably connected at its upper end to one arm of an angle lever 284, the other arm of which has a pin-and-slot connection with the slide 276.

The raceways are supplied with nails by segmental lifting plates 286, one for each raceway, which travel in guides in a nail pot or holder 288, the plates 286 passing through openings in the bottom 290 of the nail pot and being carried upon arms 292 loosely mounted upon the rock-shaft 294. Rigidly attached to the rock-shaft 294 is a crank arm 296 to which is connected a rod 298.

The rod 298 receives at its lower end a wrist pin 300 which is adjustable in a dovetailed groove 302 in a crank wheel 304 upon a cross-shaft 306. The shaft 306 is driven by a worm and gear connection with the shaft 188, the gear wheel being shown at 308 and the worm at 310. Rotation of the shaft 306 effects, through the rod 298, an oscillation of the lifting plates 286 with the shaft 294. The connections between the shaft 294 and the lifting plates 286 comprise a pawl carrying arm 312 rigidly attached to the shaft 294 and having pivoted at 314 a pawl 316 which is pressed by a spring 318, located between a downward projection of the arm 312 and the back side of the pawl, toward a catch 320 upon the arm 292. The pawl and catch are so shaped that if the lifting plate in its upward movement meets an obstacle, such as a misplaced nail, the pawl will slip over the catch and permit the plate to drop back to its lowermost position. This position is preferably determined by an adjustable stop comprising a bolt 322 confined by nuts in an offset portion 324 of an arc-shaped supporting bar 326 attached to the bottom 290 of the nail pot and extending along the path of movement of the lifting plate 286, there being one of these stop supporting bars for each lifting plate. The shaft 188 is preferably constantly rotated and the lifting plates 286 are therefore constantly oscillated with the shaft 294, between nail receiving positions in the bottom of the nail pot and nail delivering positions in alinement with the raceways, thus keeping the raceways 270 supplied with nails.

As hereinabove stated, mechanism is preferably provided for trimming the heel-seat of the boot or shoe to be operated upon while it is in position to receive the nails. The under side of the nail block 100 beneath each of the sets of nail receiving openings 102, 104 and 106 is shaped to fit the usually curved heel-seat end of the shoe. The heel-seat is therefore "laid" upon the shoe in advance of the nailing operation, being pressed up against the under side of the nail block 100 by work support operating mechanism hereinafter to be described. While the shoe and heel-seat are thus clamped in sole laying and nail receiving position, the heel-seat is trimmed by mechanism now to be described which operates preferably during the operation of the awls.

The illustrated trimming mechanism comprises a flexible knife 330 shaped to fit about the counter portion of the upper, this knife being carried by a knife carrier 332 having lateral ribs 334 arranged to slide in guideways in brackets 336 attached to the upper end of the base or standard 10, these guideways being preferably inclined so that the knife in its upward movement will trim close in to the upper and will bevel the rear end of the heel-seat to substantially its final form. The knife 330 has laterally extending pins 338 which enter slots in the carrier 332, these slots permitting the forward and backward adjustment of the knife in its carrier. This adjustment is effected, in the illustrated construction, by means of a lever 340 fulcrumed at one end upon the carrier 332 and pivotally connected at its other end to a block 342 which may be adjusted forwardly and backwardly upon the carrier 332 by an adjusting screw 344 threaded into a lug 346 upon the carrier.

The rear end of the knife bears against the lever 340 and is also supported for movement with the lever 340 as the carrier 332 moves up and down. To adjust the knife to the different sizes of shoes, mechanism is preferably provided which operates in timed relation to the mechanism for adjusting the drivers, awls and the nail block whereby, when the nailing mechanism is adjusted to operate upon a certain range of sizes of shoes, the trimming mechanism will be adjusted at the same time to operate upon the same range of sizes. This adjustment is effected by moving the forward ends of the knife 330 toward or away from each other. These ends are curved back upon themselves and embrace within the curve thus formed rollers 348 and 350 upon slide blocks 352, 354, the block 352 being adjustable in the end of a lever 356 fulcrumed at 358 upon the under side of one of the guides for the nail block 100, and the block 354 being arranged to slide in the forward end of a lever 360 fulcrumed upon a stud 362 carried upon the depending bracket 364 attached to the front of the nail block guide. Adjustment of the blocks 352 and 354 upon the levers 356 and 360 serves to vary the distance apart of the forward ends of the knife 330 independently of the automatic adjustment of these ends for different ranges of sizes. This adjustment of the blocks 352 and 354 may be effected in any suitable manner, as for example, by screws 366 and 368 carried in cap plates 370 and 372, respectively.

The levers 356 and 360 are both connected to the nail block moving arm 126 in such manner that when the nail block is adjusted to bring the appropriate set of nail receiving openings into position over the shoe to be operated upon the forward ends of the knife 330 are moved simultaneously toward or away from each other to adapt the knife in size and shape to the same shoe. The connection between the lever 356 and the arm 126 comprises a link 374 pivoted at its respective ends to the arm and lever. The connection between the arm 126 and the lever 360 comprises a lug 376 upon the arm 126 which travels in a cam slot 378 in one arm of the lever 360.

As hereinabove suggested the trimming movement of the knife 330 takes place simultaneously with the work penetrating movement of the awls. This simultaneous movement of these two mechanisms is effected in the present construction by connecting the mechanism for moving the knife to one arm 160 of the three-armed lever through which the head or casing 46 is moved downward to force the awls into the work. The mechanism for moving the knife 330 into work trimming position comprises toggle links 380 and 382, the link 380 being pivotally connected to the knife carrier 332 and the link 382 being pivoted at 384 upon the machine frame. At its knee joint the toggle comprised by the links 380, 382 is connected by a link 386 to one arm 388 of an angle lever fulcrumed at 390 in the machine frame, the other arm 392 of said angle lever being connected by a link 394 to the arm 160 of the three-armed lever hereinabove referred to. It will thus be seen that as the three-armed lever is rocked in the direction to move the head 46 downward, it will straighten the toggle which moves the knife 330 in the direction to perform the trimming operation. In order that the cutting edge of the knife 330 may not become dulled too quickly, the under side of the knife block and the adjoining surfaces against which it may cut are preferably formed of some material which is softer than the material of which the knife is made, for example, brass, lead or vulcanized fiber.

Any suitable work support may be employed with this machine, that herein illustrated being a jack of the type disclosed in United States Letters Patent 919,424, to W. H. Cuff, granted April 27, 1909, for improvements in jacks for nailing and slugging machines. The means for operating the work support comprises means for raising the work support to clamp the work in operative position and means for lowering the work support to permit the work to be removed, one of the said means being operated from one of the driving shafts and the other being operated from another driving shaft. The jack 396 herein illustrated is supported upon the jack post 398 which is formed in two parts, the reduced part 400 being surrounded by a spring 402 which bears at one end against the enlarged part of the jack post and at its other or lower end against a sleeve 404 surrounding the reduced end 400 of the jack post. At its lower end the sleeve 404 is provided with ears 406 between which is pivoted a roll 408 which bears upon a spiral cam 410 by which the jack post and jack are raised into operative position. The cam 410 is rigidly attached to the rock-shaft 412 upon which is also carried a gear wheel 414 with which meshes a segment gear 416 attached to a rock-shaft 418. The spiral cam 410 is turned in the direction to lift the jack post and jack by connections to a cam 420 upon the shaft 98 comprising an arm 422 attached to the rock-shaft 418 to which is pivotally connected at its lower end a rod 424, said rod being connected at its upper end to one arm of a lever 426 fulcrumed at 428 in the machine frame and carrying in the forked end of its other arm a cam roll 430 which bears against the cam 420.

As the spiral cam 410 is turned in its jack raising direction the jack is raised yieldingly into work clamping position, the movement of the jack being substantially equal to the movement of the sleeve until the upper face of the work comes into contact with the under face of the nail block. When this happens the spring 402 will be compressed. As the movement of the spiral cam 410 is the same for each operation, the spring 402 will be compressed an amount which is dependent upon the thickness of the work.

In order that the nails may be driven against an unyielding support means is provided for introducing a stop in the path of the jack post so that the jack post will be kept from downward movement during the nailing operation. In the illustrated embodiment of this feature of the invention, the reduced part 400 of the jack post is provided with a slot in which travels a wedge-shaped slide 432, the sleeve 404 being provided with a corresponding slot to receive and guide the said slide. The lower edge of the slide 432 rests upon the bottom of the slot in the sleeve 404. Attached to the reduced part 400 of the jack post is a collar 434 having ears 436 projecting through a cutaway side of the sleeve 404 and between these ears is fulcrumed a bell crank 438, having a depending arm pivotally connected at its lower end to the slide 432. The other arm of the bell crank is pivotally connected to a dog 440 attached to the sleeve 404.

The operation of the construction just described is as follows: After the jack has been lifted far enough to bring the upper face of the work into contact with the lower face of the nail block 100, the continued upward movement of the sleeve 404, as the spiral cam 410 continues to turn, serves to compress the spring 402 and thereby yieldingly to press the work against the under side of the nail block. As the sleeve 404 moves up, however, the dog 440 bearing against the short arm of the bell crank 438 turns the bell crank about its pivot and thereby moves the slide 432 inward, so that a lower portion of its inclined upper edge rests beneath the inclined upper end of the slot in the reduced part 400 of the jack post. This movement of the slide 432 through the slot in the reduced part of the jack post is a compensating movement, so proportioned that the slide 432 will always form a stop engaging with its lower edge the lower end of the slot in the sleeve 404, and engaging with its upper edge the upper end of the slot in the reduced part of the jack post. There is thus always an unyielding support for the jack in the direction of the nail driving movement. The jack is lowered by mechanism which operates to turn the spiral cam 410 in the direction opposite to that in which it is turned to elevate the jack. This mechanism comprises a second arm 442 connected to the rock-shaft 418 and connected to a cam 444 upon the driving shaft 44 by connections comprising a rod 446 pivotally connected at one end to the arm 442 and pivotally connected at its other end to one arm of a lever 448, the other arm of which is forked at its end and carries between the fork members a cam roll 450 which bears against the cam 444.

In Fig. 16 of the drawings the jack is shown in its lowermost position. In this figure it will be noted that the cams 420 and 444 are so angularly positioned upon their respective shafts that the high portion of the cam 444 will move out of contact with the cam roll 450 before the high portion of the cam 420 begins to act upon the roll 430. This permits the lever 448 to be turned about the common fulcrum 428 of the two levers 426 and 448 as the rock-shaft 418 is turned by the action of the cam 420 upon the lever 426. In a similar way the high portion of the cam 420 is moved out of engagement with the roll 430 before the high portion of the cam 444 begins to operate upon the roll 450.

As hereinabove indicated, the machine is provided with two normally inoperative main driving shafts 44 and 98 and a normally operative shaft 188. Each of the driving shafts 44 and 98 is provided with a loose driving pulley to which the shaft may be clutched when it is desired to render it operative to drive the various mechanisms connected to it. In the operation of the machine the pulley 452 is first clutched to the shaft 98 when the treadle 454 which controls the starting of the machine is depressed, the mechanisms operated by or from the shaft 98 being arranged to perform their functions before the mechanisms operated from the shaft 44.

The clutch and clutch controlling means are shown in detail in Figs. 12, 13 and 14. Keyed upon the shaft 98 upon which the pulley 452 is loosely mounted is a disk 456 having a peripheral groove 458 in which the wedge-shaped end 460 of a bell crank 462 is guided as it performs its clutch releasing function, this wedge-shaped end at this time entering a notch 464 in a spring-pressed plunger 466 guided in a transverse opening in the disk 456 as it is moved into or out of engagement with one of the pins 468 on the pulley 452. When drawn out of clutching engagement with one of the pins 468 the plunger 466 engages a pin 470 upon the machine frame, springing back a latch 472 just before it engages the pin 470 whereby the shaft 98 is positively stopped and is locked against movement in either direction.

The bell crank 462 is rocked in the direction to lift its wedge-shaped end 460 out of the notch 464 in the plunger 466 by means connected with the treadle 454 comprising a lifting bar 474 pivoted upon the end of an arm 476 attached to a rock-shaft 478 having bearings in the machine frame, a second arm 480 upon said rock-shaft being connected by a rod 482 to the treadle 454. The lifting bar 474 is provided with a shelf 484 upon which rests the enlarged end 486 of the lower arm of the bell crank 462, the end 486 being also shaped to engage the side of the lifting bar 474 and keep it from being drawn toward the front of the machine by the spring 488 by which it is yieldingly maintained in operative relation to the bell crank 462. As the treadle 454 is depressed the lifting bar 474 is raised through its connection with the treadle, thereby rocking the bell crank about its pivot in the direction to lift its wedge-shaped end 460 out of the notch 464 in the spring-pressed plunger 466. To stop the shaft 98 after one rotation, the disk 456 is provided with a pin 490 which engages the curved upper side 492 of the lifting bar 474 after the shaft 98 and the pulley 452 have begun to rotate together, and pushes the lifting bar toward the back side of the machine out from beneath the end 486 of the bell crank arm, thereby permitting the bell crank arm to be drawn down by its spring 494, thus again bringing the wedge-shaped end 460 of the bell crank into operative position in the groove 458 of the disk 456.

The shaft 44 is provided with a loose pulley 452′ which is arranged to be clutched to the shaft by clutch mechanism substantially like that employed to clutch the pulley 452 to the shaft 98, this clutch mechanism comprising a bell crank 462′, a spring-pressed plunger 466′ and a lifting bar 474′. The lifting bar 474′ is pivoted upon one end of a lever 496 fulcrumed at 498 in the machine frame and carrying at its other end a cam roll 500 arranged to be engaged by a tappet cam 502 upon the cam disk 92. The tappet cam 502 is so located upon the cam disk 92 that it serves to depress the end of the lever 496 which carries the cam roll 500 near the end of the single rotation of the shaft 98, thereby raising the lifting plate 474′ and rocking the bell crank 462′ in the direction to lift its wedge-shaped end out of the notch in the spring-pressed plunger 466′ to cause the pulley 452′ to be clutched to the shaft 44.

Various means are provided for insuring the proper coöperation of the different mechanisms and to prevent the operation of any mechanism when it or some coöperating mechanism is not in the proper position of rest or adjustment. To prevent the actuation of the clutch through which the loose pulley 452 is clutched to the shaft 98, in the event that the mechanism which effects the adjustment from one size range to another has not been so manipulated that the parts controlled by it are in their proper positions of adjustment, means is provided for preventing the depression of the treadle. This means comprises a notched lever 504 turning about a vertical fulcrum 506 and shaped to extend along the path of movement of the lever 110. The lever 110 is provided with a depending pin 508 arranged to enter one of the notches 510 in the lever 504 when the lever 110 is in one of its proper positions of adjustment. When the pin 508 is in one of the notches in the lever 504 a spring 512 holds the arc-shaped arm of the lever 504 in close contact with the arc-shaped plate 135. When, however, the lever 110 is between two of its positions of adjustment, the pin 508 will hold the arc-shaped end of the lever 504 away from the plate 135 and the curved end of the other arm 514 of the lever 504 will rest beneath a knob 516 upon a rod 518 connected to the arm 480 to which the treadle rod 482 is also connected. The arm 514 thus prevents the depression of the treadle 454 when the awls, drivers and nail block are not in their proper positions of adjustment.

To prevent the starting of the machine when the nail loader 162 is in its nail delivering position or in a position between the nail delivering and nail receiving positions, means is provided for preventing the depression of the treadle until the nail loader has been moved into nail receiving position. This means comprises a bar 520 pivoted upon the machine frame at 522 and connected by a link 524 to the arm 480 in such manner that when the bar 520 is in its upright position the pivots of the link 524 and the pivot of the bar 520 will all be in a straight line. At this time the treadle 454 cannot be depressed. The bar 520 will normally be maintained in its upright position by a spring 526 connected at one end to an arm 528 below the pivot 522 and at its other end to the machine frame.

To permit the treadle to be depressed when the nail loader 162 is in nail receiving position, the bar 520 is connected by a rod 530 to a lever 532 pivoted upon the machine frame and having an arm extending into the path of movement of the boss 534 surrounding the spring-pressed plunger 246. As the nail loader 162 is moved into nail receiving position, the boss 534 strikes the arm of the lever 532 and moves the bar 520 toward the left in Fig. 10, thereby permitting the treadle 454 to be depressed.

During the single rotation of the shaft 98 the nail loader 162 will be moved into nail delivering position by its connection with the slide 240 and will be returned into nail receiving position by its connections with the constantly rotating shaft 188. To prevent the actuation of the shaft 44 before the nail loader is returned into nail receiving position, mechanism is provided for moving the lifting bar 474' out of operative relation to the bell crank 462' so that when the lever 496 is rocked by the tappet cam 502 the pulley 452' will not be clutched to the shaft 44. This mechanism comprises a rock-shaft 536 journaled in bearings in the back part of the machine frame and having at one end an arm 538 connected by a slotted link 540 to a pin 542 upon the lifting bar 474' and having at its other end an arm 544 connected by a slotted link 546 to a pin 548 upon the lower arm of the bell crank 462. Between the arms 538 and 544 is a third arm 550 slotted at its upper end and having adjustably connected with said end a rod 552 pivotally connected at its other end to one arm of a tripping lever 554 arranged to be engaged by a tripping extension 556 upon the nail loader 162 as the nail loader comes into nail receiving position. The other arm of the tripping lever 554 is hook-shaped and is engaged by the hooked end of the extension 556 to move the tripping lever into normal, vertical position as the nail loader 162 moves from nail receiving into nail delivering position.

When the parts are in the position shown in Fig. 12, that is when the nail loader is in nail receiving position, the lever 554 is turned down into substantially a horizontal position, thereby moving the arm 550 toward the rear and rocking the rock-shaft 536 to cause the arm 538 through its connection with the pin 542 to move the lifting bar 474' out of operative position beneath the lower arm of the bell crank 462', thus preventing the clutching of the pulley 452' to the shaft 44 when the nail loader is in this position. The slot in the link 546 is at this time in such position that when the treadle 454 is depressed to raise the lifting bar 474 and through said bar to move the wedge 460 out of engagement with the plunger 466, the pin 548 upon the lower arm of the bell crank will move in said slot without rocking the shaft 536. After the pulley 452 has been clutched to the shaft 98 and the nail loader 162 has been moved into operative position, the link 546 will be lowered as the rock-shaft 536 is rocked by its connections with the tripping lever 554 and by the spring which acts upon the lifting bar 474' and the slot in the link 546 will be brought into such position that if the wedge 460 fails to trip the clutch at the end of one rotation but instead rides upon the plunger 466, the link will be raised by the engagement of the pin 548 with the upper end of the slot, thus rocking the shaft 536 in the direction to cause the lifting bar 474' to be thrown out of operative relation to the bell crank 462' to prevent the clutch which controls the shaft 44 from being actuated by the tappet cam 502 and the connections hereinabove described. This prevents the shafts 98 and 44 from being operated at the same time and thus causing the mechanisms controlled by the two shafts to interfere with each other.

In some of the following claims the nail block 100 is defined as a part provided with a plurality of sets of nail receiving openings or as provided with a set of nail receiving openings for each gang of drivers. It will be understood, of course, that with respect to a feature of the invention like this, which admits of so many obvious modifications and for which there are so many obvious mechanical equivalents, it is intended that the language used in the claims shall be given the broadest construction consistent with the state of the art.

The improved fastening assembling and delivering mechanism herein shown and described is not herein claimed but is made the subject-matter of a divisional application Serial No. 8702 filed Feb. 17, 1915.

Having described my invention, what I claim as new and desire to secure by Letters Patent of the United States is:—

1. A machine of the class described, having, in combination, an awl and a driver arranged to operate in succession at the same nail location, reciprocating awl operating means and reciprocating driver operating means guided within the awl operating means.

2. A machine of the class described, having, in combination, reciprocating awl operating means, reciprocating driver operating means guided within the awl operating means, a nail block having a nail receiving opening, an awl, and a driver, and means for bringing said awl into and out of operative relation to its operating means in such manner that the awl and the driver may be moved in succession into the nail receiving opening in the nail block.

3. A nailing machine, having, in combination, reciprocating awl operating means, and reciprocating driver operating means, one of said means being guided within the other, a nail block having a nail receiving opening, an awl and a driver, one of said parts being normally in operative relation to its operating means and the other being movable into and out of operative relation to its operating means whereby they may be moved in succession into the nail receiving opening in the nail block.

4. A nailing machine, having, in combination, reciprocating awl operating means, reciprocating driver operating means guided within the awl operating means, a driver normally in operative relation to its operating means, an awl normally in inoperative relation to its operating means, and means for moving the awl into and out of operative relation to the awl operating means in advance of the operation of the driver operating means.

5. A machine of the class described, having, in combination, reciprocating awl operating means, reciprocating driver operating means guided within the awl operating means, a plurality of gangs of awls, a plurality of gangs of drivers and means for bringing any one of the gangs of awls and any one of the gangs of drivers into operative relationship to its respective operating means.

6. A nailing machine, having, in combination, awl operating means, a plurality of gangs of awls adjustable along a path which does not include the operating position, and means for transferring any one of said gangs of awls from said path into operating position in said awl operating means.

7. A nailing machine, having, in combination, awl operating means and driver operating means guided within the awl operating means, a plurality of gangs of awls adjustable along a path lying outside the operating position, a plurality of gangs of drivers adjustable along a path including the operating position, and means for moving any one of said gangs of awls from said path into and out of operating position in the awl operating means.

8. A nailing machine, having, in combination, awl operating means and driver operating means guided within the awl operating means, a plurality of gangs of awls adjustable along a path lying outside the operating position, a plurality of gangs of drivers adjustable along a path including the operating position, and means operating transversely to the path of adjustment of said drivers for moving any one of said gangs of awls from its path of adjustment into and out of operative position in the awl operating means.

9. A machine of the class described, having, in combination, reciprocating awl operating means, reciprocating driver operating means guided within the awl operating means, a slide movable transversely to the awl operating means, and a plurality of gangs of drivers carried by said slide, said gangs of drivers being so arranged in said slide that they are brought successively into operative relationship to the driver operating means as the slide is moved transversely to the awl operating means.

10. A nailing machine, having, in combination, reciprocating awl operating means, reciprocating driver operating means guided within the awl operating means, a plurality of gangs of drivers adjustable along a path including the operating position, and means guided transversely through the awl operating means for moving said gangs of drivers successively into operative relation to the driver operating means.

11. A machine of the class described, having, in combination, reciprocating awl operating means, reciprocating driver operating means guided within the awl operating means, a gang of drivers normally in operative relationship to the driver operating means, a gang of awls normally in inoperative relationship to the awl operating means, and means for moving said gang of awls into and out of operative relationship to the awl operating means.

12. A nailing machine, having, in combination, awl operating means and driver operating means, a plurality of gangs of awls adjustable along a path lying outside of the operating position, a plurality of gangs of drivers adjustable along a path including the operating position, a part or parts providing a set of nail receiving openings for each gang of awls and its associated gang of drivers likewise adjustable along a path including the operating position, and a single means for effecting the aforementioned three adjustments.

13. A machine of the class described, having, in combination, a nail block provided with a plurality of sets of nail receiving openings and arranged to move in an arc-shaped path in the plane of said openings to bring successive sets of openings into operative position, a plurality of sets of awls having a corresponding movement of adjustment in a path concentric with but outside the aforementioned path, and a single means for effecting the adjustment of the awls and the nail block, said means being constructed to permit the movement of a set of awls from one path to the other.

14. A machine of the class described, having, in combination, a nail block provided with a plurality of sets of nail receiving openings and adjustable along an arc-shaped path to bring successive sets of openings into operative position, and a nail loader movable between nail receiving and nail delivering positions along a path concentric with the path of adjustment of the nail block.

15. A machine of the class described, having, in combination, a nail block provided with a plurality of sets of nail receiving openings, a plurality of gangs of awls, a plurality of gangs of drivers, means for moving one of said gangs of awls and one of said gangs of drivers in succession into one of the sets of nail receiving openings in the nail block, and a single means for effecting the adjustment of the nail block and of the gangs of awls and drivers.

16. A nailing machine, having, in combination, driver operating means, a plurality of gangs of drivers adjustable along a path including the operating position, a part providing a set of nail receiving openings for each gang of drivers likewise adjustable along a path including the operating position, a single means for effecting the beforementioned adjustment, means for actuating the driver operating means, and means for preventing the actuation of said driver operating means when none of said gangs of drivers and none of said sets of nail receiving openings are in operative position.

17. A machine of the class described, having, in combination, a nail block provided with a plurality of sets of nail receiving openings suited to different size ranges of shoes, a corresponding plurality of gangs of awls and of gangs of drivers, manually operated means for effecting a movement into coöperative relation to each other of a set of nail receiving openings and the appropriate gangs of awls and drivers, means for operating the awls and drivers and means for preventing the operation of the awls and drivers except when in proper coöperative relationship to the nail receiving openings.

18. A nailing machine, having, in combination, driver operating means, a plurality of gangs of drivers movable successively into operative relation to said driver operating means, a part providing a set of nail receiving openings for each gang of drivers adjustable along an arc-shaped path including the operating position to bring the appropriate set of nail receiving openings beneath the gang of drivers which is in operative position and a nail loader movable between nail receiving and nail delivering positions about the center of adjustment of said sets of nail receiving openings.

19. A nailing machine, having, in combination, two operating shafts, nail driving mechanism operated from one of said shafts and nail delivering mechanism operated from the other of said shafts, means for actuating one of said shafts when the operations to be effected through the other shaft have been completed, and means for preventing the actuation of the shaft secondly to be actuated if the operations to be effected through the other shaft have not been completed.

20. The combination with sole laying means arranged to lay the sole at a single operation, of means for inserting sole attaching fastenings, and means for trimming the edge of the sole, both operating while the sole is in the sole laying means.

21. A machine of the class described, having, in combination, means operating during a single operation to lay the heel seat end of an outsole, means for attaching the outsole to the insole and upper while in operative position in the sole laying means, and means for trimming the said heel seat also constructed to operate on said heel seat while it is in operative position in the sole laying means.

22. A machine of the class described, having, in combination, mechanism operating during a single operation to secure the heel seat end of an outsole to the insole and upper, and means also operating during a single operation to trim the said heel seat while in position to receive the attaching fastenings constructed and arranged to bevel said heel seat during the trimming operation.

23. A machine of the class described, having, in combination, mechanism operating during a single operation to secure the heel seat end of an outsole to the insole and upper, and means also operating during a single operation to trim the said heel seat while in position to receive the attaching fastenings arranged to be moved at an oblique angle to the direction of operation of the attaching mechanism whereby said heel seat is beveled approximately to its final form.

24. A machine of the class described, having, in combination, means for attaching the heel seat end of an outsole to the insole and upper constructed to drive at a single operation all of the attaching fastenings for a single shoe, and means for trimming the heel seat end of said sole while it is in position to receive the attaching fastenings.

25. A machine of the class described, having, in combination, means for attaching the heel seat end of an outsole to the insole and upper constructed to drive at a single operation all of the attaching fastenings and adjustable to different size ranges, means for trimming the heel seat end of said sole while it is in position to receive the attaching fastenings comprising a flexible knife also adjustable to different size ranges, and a single means for effecting said two adjustments.

26. A machine of the class described, having, in combination, mechanism for attaching heel seats having provision for adjustment to different size ranges of shoes, means for trimming the heel seat while in position to be attached, likewise having provision for adjustment to different size ranges, and means for simultaneously effecting the adjustment of said attaching mechanism and of said trimming means.

27. A machine of the class described, having, in combination, means for attaching the heel seat end of an outsole constructed to drive at a single operation all of the attaching fastenings for a single shoe, and means for trimming the heel seat end of said sole while it is in position to receive the attaching fastenings comprising a flexible knife shaped to embrace the counter of the shoe and trim the heel seat end of said sole to the desired contour at a single operation.

28. A machine of the class described, having, in combination, means for attaching the heel seat end of an outsole constructed to drive at a single operation all of the attaching fastenings for a single shoe, and means for trimming the heel seat end of said sole while it is in position to receive the attaching fastenings arranged to operate in advance of the attaching operation.

29. A machine of the class described, having, in combination, means for attaching the heel seat end of an outsole to the insole and upper comprising means for inserting at a single operation the number of nails required for this purpose, a corresponding number of awls, means for operating said awls to cause them to form nail receiving openings in advance of the nail inserting operation, and means for trimming the work while it is in position to receive the heel seat attaching nails arranged to operate while the awls are forming the nail receiving openings.

30. A machine of the class described, having, in combination, mechanism for attaching the heel seat end of an outsole to the insole and upper constructed to insert at a single operation all the fastenings required for this purpose, a gang of awls for forming in the sole in advance of the fastening inserting operation fastening receiving openings, means for operating said awls, and means operated from the awl operating means for trimming the heel seat while it is in position to receive the attaching fastenings.

31. A machine of the class described, having, in combination, a nail block provided with a plurality of nail receiving openings and shaped on its under side to fit the heel seat end of a shoe, means for pressing the shoe and outsole against the under side of said block to lay the heel seat end of the outsole, and a knife shaped to trim the heel seat arranged to be moved for this purpose into engagement with the under side of the nail block during the sole laying operation.

32. A nailing machine, having, in combination, a plurality of gangs of drivers each adapted to a different range of shoe sizes, a plurality of gangs of awls adapted to coöperate with the respective gangs of drivers, a part providing a plurality of sets of nail receiving openings suited to the respective sets of drivers and awls, operating means for the awls and drivers, and means whereby the drivers and awls and the nail receiving openings for a particular range of shoe sizes may be simultaneously brought into operative relation to the operating means.

33. A nailing machine, having, in combination, a plurality of gangs of drivers and a plurality of gangs of awls, a part providing a plurality of sets of nail receiving openings suited to the respective sets of drivers and awls, operating means for the drivers and awls, means whereby a gang of drivers and the appropriate gang of awls and set of nail receiving openings may be brought simultaneously into operative relation to the operating means, said part provided with the nail receiving openings being constrained from vertical movement when in operative position, and means for pressing the work to be operated upon against the under side of said part.

34. A nailing machine, having, in combination, a plurality of gangs of drivers each adapted for a different range of shoe sizes, a plurality of gangs of awls adapted to coöperate with the respective gangs of drivers, a part providing a plurality of sets of nail receiving openings suited to the respective sets of drivers and awls, and operating means for the drivers and awls with which only the drivers, awls, and nail receiving openings for a single range of shoe sizes are adapted to coöperate at one time, provision being made whereby all of the gangs of drivers, all of the gangs of awls and all of the sets of nail receiving openings may be moved simultaneously to effect the movement into or out of operative position of the drivers, awls and nail receiving openings for a particular range of shoe sizes.

35. A nailing machine, having, in combination, a plurality of gangs of drivers each adapted to a different range of shoe sizes, a part providing a plurality of sets of nail receiving openings suited to the respective sets of drivers, means for operating the drivers, means for supporting the work to be operated upon beneath the nail receiving openings, and means whereby the gangs of drivers and the sets of nail receiving openings may be moved simultaneously to effect the movement into and out of operative relation to the work of the gang of drivers and the set of nail receiving openings for a particular range of shoe sizes.

In testimony whereof I have signed my name to this specification in the presence of two subscribing witnesses.

PERLEY R. GLASS.

Witnesses:
 H. DORSEY SPENCER,
 FREDERICK L. EDMANDS.